United States Patent [19]

Rollin et al.

[11] Patent Number: 5,013,142
[45] Date of Patent: May 7, 1991

[54] BIFOCAL OPTICAL SYSTEM

[75] Inventors: Joël Rollin; Jean-Claude Perrin, both of Vanves, France

[73] Assignee: U.S. Philips Corp., New York, N.Y.

[21] Appl. No.: 449,638

[22] Filed: Dec. 12, 1989

[30] Foreign Application Priority Data

Dec. 16, 1988 [FR] France .................................. 88 16642

[51] Int. Cl.$^5$ ............................................ G02B 15/02
[52] U.S. Cl. .................................................. 350/422
[58] Field of Search ............... 350/449, 450, 422, 427, 350/423

[56] References Cited

FOREIGN PATENT DOCUMENTS 2230533 6/1972 Fed. Rep. of Germany .
3505277 8/1985 Fed. Rep. of Germany ...... 350/422
58-108510 6/1983 Japan .
1048455 10/1983 U.S.S.R. .

Primary Examiner—Paul M. Dzierzynski
Attorney, Agent, or Firm—William L. Botjer

[57] ABSTRACT

The bifocal optical system is formed in the long focal length mode by an objective having fixed lenses L1, L2, L3, L4 to which, for obtaining the short focal length, a group of movable lenses L5, L6, L7, L8 is added. The lenses L5, L6, L7 and L8 are accommodated in a holder (MB) which is rotatable around an axis YY' which extends parallel to the optical axis XX', thereby enabling very wide tolerances in the positioning of the movable holder.

4 Claims, 1 Drawing Sheet

BIFOCAL OPTICAL SYSTEM

BACKGROUND OF THE INVENTION

The present invention relates to a bifocal optical system, having a long focal length LF and a short focal length SF and comprising an objective with fixed lenses arranged in a front group and a rear group, and an intermediate group in a movable holder for insertion between the front and rear groups.

An optical system of this type, having three groups of lenses, is disclosed in U.S. Pat. No. 4,449,791. In this Patent, the optical system is of the zoom objective type, that is to say that the variation in focal length is obtained by moving second and third groups along the optical axis. In a bifocal optical system of this type the long and the short focal length can be obtained by moving one single group, which has the advantage of a structure of small bulk. However, the choice of such a solution is based on the presumption of very strict tolerances in the positioning of the movable holder to obtain an adequate stability of the axis of the long focal length and preventing a lateral shift of the image in the focal plane due to shifts of the holder, which renders such a realisation delicate and difficult. A less difficult solution to preserve an adequate stability of the axis of long focal length is to determine the long focal length only by fixed lenses, whilst passing to the short focal length is obtained by rotating the holder around an axis which is perpendicular to the optical axis. Such a solution is proposed in the publication SPIE, vol. 131, Practical infrared optics (1979), p. 24, but this solution has the disadvantage that it is particularly complicated.

SUMMARY OF THE INVENTION

The invention has for its object to obviate these different disadvantages and provides means to reduce the compactness and the costs of the system whilst preserving the advantage that it is of small bulk.

To that end, the optical system of the type defined in the opening paragraph, is characterized in that the front group having a focal length $LF/\gamma$ is convergent and comprises three lenses, the rear group is convergent and includes a lens having a magnification, in that the movable group is rotatable around an axis parallel to the system optical axis and in that the intermediate group is convergent, constituted by four lenses and has a magnification of $\gamma'=SF/LF$.

In addition, the present invention is particularly suitable for a mixed day/night observation device in which the bifocal optical system produces an image of the scene in a day channel, for example on a CCD strip or via a mixing prism takes the image from an array of exit diodes of a thermal vision system (night channel). Thus, in uses such as the mixed day/night observation, a controllable iris is arranged for the purpose of dosing the degree of illumination of the day channel relative to the night channel, upstream (so that it only acts on the day channel) of the day channel-night channel coupling. Certain drawbacks originate from the fact that such a coupling is used. For example, a problem of vignetting in the field of view in the day channel is created by the iris placed upstream of the coupling, if the entrance pupil of the system is not maintained near said iris. Moreover, there is the further problem of maintaining the illumination in the night channel constants during switching of the field of view.

In accordance with a characteristic of the system in accordance with the invention, for use in a mixed day/night vision device having a controllable iris upstream of the coupling, the system also includes a diaphragm which forms an integral part of the movable holder to maintain the illumination of the night channel constant during the switch to the short focal length, the diaphragm being positioned near the leading group.

Actually, for an optical combination under consideration here, the choice in accordance with the invention rotating the movable holder around an axis which extends parallel to the optical axis has several advantages. On the one hand it renders it possible to insert a diaphragm near the leading group as for such rotation such a very little room along the optical axis is required. On the other hand it allows always the establishment of very large tolerances in the positioning of the movable holder for an optical combination under consideration.

Moreover, in the night channel, the preservation of the illumination during the switch of the field is obtained independently and in another manner than by controlling the luminance of the light-emitting diodes. Actually, during the switch from the long to the short focal length the size of the entrance pupil in the ratio of the focal lengths is reduced. Thus, preserving a constant geometrical étendue or throughput along the axis, that is to say the preservation of the angle defining the image numerical aperture, is rendered possible by the addition of a diaphragm to the system by means of the holder.

In accordance with a further characteristic of the system in accordance to the invention for use in a mixed day/night vision arrangement, the front group is chosen with a relative aperture of low value, the intermediate group has a magnification value $\gamma$, near unity, whilst the rear group has the magnification value $\gamma=\gamma'/2$, such a configuration being very advantageous for the determination of the movable holder and consequently for the mechanical introduction of said movable holder.

Thus, because of the very moderate relative aperture of the front group, for example F/15 and the magnification value of the intermediate group Y' which is rather near to unity, for example $\gamma'=\frac{2}{3}$ (determined by the ratio between the focal length: $\gamma'=Sf/LF$), the rotating system can be very simple and does not need to ensure a very strict lateral positioning of the intermediate group. Typically, an eccentricity (that is to say a deviation between the main axis of the system and the axis of the holder in the short focal length position) of 200 μm and consequently a precision in the position of the holder axis relative to the optical axis of the order of 200 μm are definitely acceptable and only produce acceptable drops in the MTF (Modulation Transfer Function).

Likewise, because of the relatively weak magnification of the rear group, for example $\gamma=0.34$, and the magnification $\gamma'$ of the intermediate group which is, nearly unity, the eccentricity of the movable holder causes moderate image shifts in the region of the focal plane.

Such a system consequently ensures a stability of the axis which is definitely suitable in the short focal length position and is perfect in the long focal length position.

At regards vignetting in the day channel, the optical system according to the invention is, in the long focal length position, optimized in such manner as to image the entrance pupil forward near the front iris. In the short focal length position the presence of a diaphragm near the front group by rotating the movable holder, allows a position of the entrance pupil not too far inside the leading group, that is to say too far from the front iris and thus to minimize vignetting in the day channel. The addition of an diaphragm in the short focal length in the optical system allows the preservation of the illumination of the night channel during rotation of the holder.

BRIEF DESCRIPTION OF THE DRAWINGS

The following description given, by way of example, with reference to the accompanying drawings, will make it better understood how the invention can be put into effect.

FIG. 1 shows an optical system of an embodiment of the system according to the invention.

DETAILED DESCRIPTION OF THE EMBODIMENT

Figure 1A:
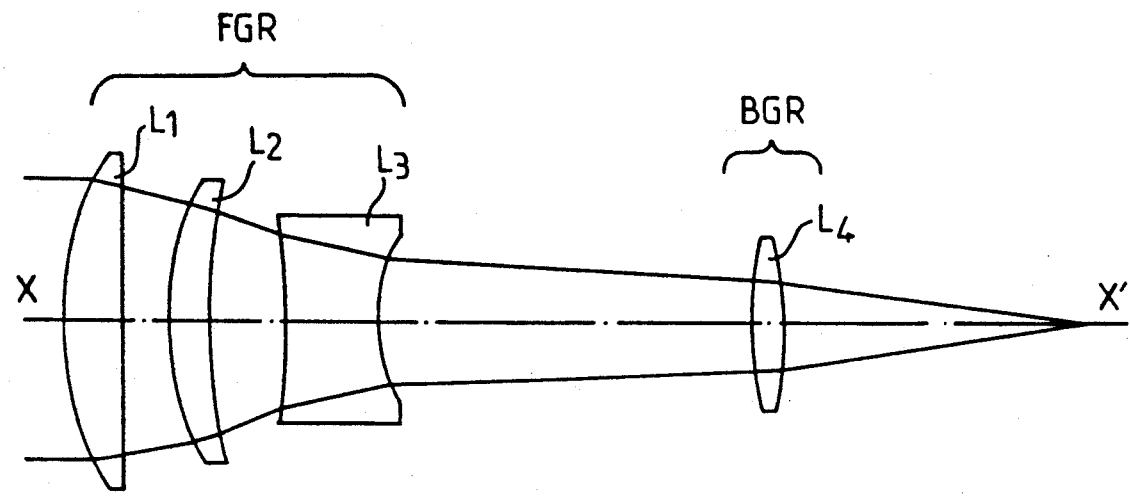
FIG. 1a shows the system in its long focal length position whilst

In FIG. 1a and in accordance with a non-limitative embodiment, the bifocal optical system of a long focal length LF is composed of an objective having fixed lenses constituted by a leading group FGR and a rear group BGR centered on the optical axis XX'. In accordance with the invention, the leading group of focal length LF/ is convergent and comprises three lenses L1, L2 and L3 and the rear group is also convergent and comprises one lens L4 which has a magnification value $\gamma$. The system is optimized (cf. the constructional data given hereinafter) in the long focal length position in such a manner as to advance the entrance pupil, to a position near the front iris (not shown in the drawing).

Figure 1B:
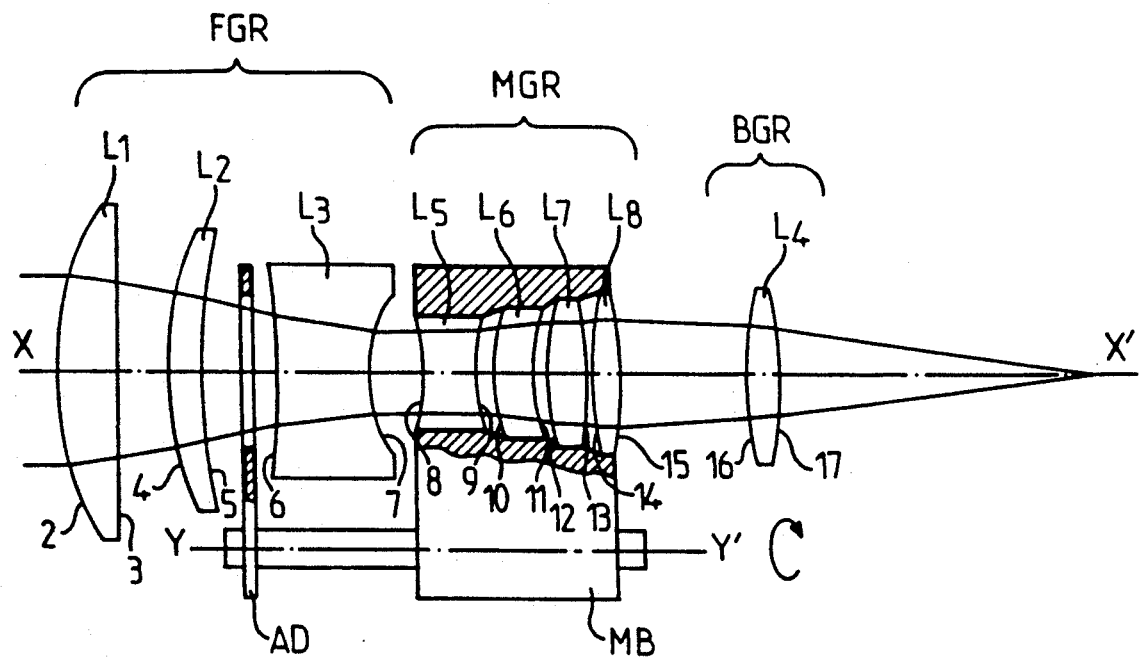
FIG. 1b shows the system in its short focal length position.

In FIG. 1b the optical system is shown in the short focal length situation SF. This situation is obtained by arranging between the leading group FGR and the rear group BGR an intermediate group MGR by means of a moving holder MB (shown in a partially cross-sectional view) which in accordance with the invention rotates around an axis YY' which is parallel to the optical axis XX'. The intermediate group is convergent, it is formed by four lenses L5, L6, L7, L8 and has a magnification $\gamma' = SF/LF$.

In accordance with a characteristic of the invention, when the system is used in a mixed day/night vision arrangement in which upstream a controllable iris is arranged for dosing the illumination of the day channel relative to the night channel, it is advantageous to include in addition diaphragm AD (shown in a partial cross-sectional view) which is an integral part of the movable holder MB to preserve the illumination of the night channel during the switch to the short focal length. The diaphragm is preferably positioned (and this is possible thanks to the choice of the totaling mode) near the front group FGR so as to keep the entrance pupil of the system as close as possible to the front iris and to thus minimize vignetting in the day channel. In the drawing the diaphragm AD is arranged, once it has been positioned, between the lens L2 and the lens L3 of the front group FGR. It might alternatively be arranged after the lens L3.

In accordance with a further characteristic of the system in accordance with the invention used in a day/night vision device, the front group FGR (L1, L2, L3) is chosen with a relative aperture of a low value, for example F/15, the intermediate group MGR (L5, L6, L7, L8) has a magnification value $\gamma'$ close to unity, in this case $\gamma' = \frac{2}{3}$, whilst the rear group BGR (L1) has a magnification value $\gamma = \gamma'/2$, in this case $\gamma = 0.34$.

In the drawing, the consecutive optical surfaces of the lenses L1, L2, L3 have the reference numerals 2 to 7, the optical surfaces of the lenses L5, L6, L7, L8 are given the reference numerals 8 to 15 and the optical surfaces of the lens L4 are given the reference numerals 16 and 17.

In the proposed embodiment the long focal length LF has for its value 130 mm and the short focal length SF has the value 86.66 mm. The constructional data in the short focal length situation are as follows and here relate to the reference numerals denoted in the diagram of FIG. 1b.

| N° of the surface | Radius | Subsequent material | Subsequent thickness |
|---|---|---|---|
| 2 | 45.073 | BALF5 | 8.581 |
| 3 | −1090.367 | AIR | 5.637 |
| 4 | 39.611 | LAK21 | 5.680 |
| 5 | 84.688 | AIR | 8.787 |
| 6 | −293.757 | SF6 | 13.064 |
| 7 | 21.752 | AIR | 6.693 |
| 8 | −33.773 | SK5 | 6.865 |
| 9 | 47.715 | AIR | 2.703 |
| 10 | 45.052 | SF6 | 4.881 |
| 11 | 25.250 | AIR | 1.092 |
| 12 | 29.141 | SK11 | 6.104 |
| 13 | −120.174 | AIR | 1.102 |
| 14 | 113.326 | FK3 | 3.379 |
| 15 | −37.859 | AIR | 17.093 |
| 16 | 87.406 | BAF4 | 3.426 |
| 17 | −64.601 | AIR | 40.945 | wherein "radius" indicates the radium of curvature of the surface referred to, "subsequent thickness" indicates the spacing to be respected from said referenced surface to the subsequent referenced surface, which interval is measured along the optical axis, "radius" and "subsequent thickness" are expressed in millimeters.

Such an optical formula and its rotating system are advantageous and are used with great advantage in mixed day/night vision devices. By their design they have the following different advantages:

a significant reduction of vignetting in the field of view in the day channel which is basically created by the front iris (used in this type of application), preservation of the illumination of the night channel during the field switch, independently and differently than by brightness control of the light-emitting diodes, a perfect stability of the axis in the long focal length situation and a very suitable stability in the short focal length situation in view of applications of the type for which the system is intended, great simplicity and small bulk of the devices for changing the field of view, manually or by motor control.

We claim:

1. A bifocal optical system, having a long focal length LF and a short focal length SF and comprising an objective with fixed lenses arranged in a front group and a rear group, and an intermediate group in a movable holder for insertion between the front and rear groups, characterized in that the front group having a focal length LF/$\gamma$ is convergent and comprises three lenses, the rear group is convergent and includes a lens having a magnification $\gamma$ in that the movable holder is rotatable around an axis parallel to the system optical axis, and in the intermediate group is convergent constituted by four lenses and has a magnification of $\gamma' = SF/LF$.

2. A bifocal optical system as claimed in claim 1, for use in a mixed day/night vision device having at the front side a controllable iris for dosing the illumination of the day channel relative to the night channel, characterized in that in addition it includes an diaphragm which forms an integral part of the movable holder for preserving the illumination of the night channel during the switch to the short focal length, the diaphragm being positioned near the front group.

3. A bifocal optical system as claimed in claim 1, for used in a mixed day/night vision device, characterized in that the front group has a small relative aperture, the intermediate group has a magnification value $\gamma'$ near utility, whilst the rear group has a magnification $\gamma = \gamma'/2$.

4. A bifocal optical system as claimed in claim 1, characterized in that, in the short focal length situation, the lenses forming the system are realised and adjusted in accordance with the following value Table, in which the work "radius" indicates the radius of curvature of the denoted surface, the words "subsequent thickness" indicate the spacing to be allowed between said denoted surface and the subsequent denoted surface, which spacing is measured along the optical axis, "radius" and "subsequent thickness" being expressed in millimeters:

| $N^O$ of the surface | Radius | Subsequent material | Subsequent thickness |
|---|---|---|---|
| 2 | 45.073 | BALF5 | 8.581 |
| 3 | −1090.367 | AIR | 5.637 |
| 4 | 39.611 | LAK21 | 5.680 |
| 5 | 84.688 | AIR | 8.787 |
| 6 | −293.757 | SF6 | 13.064 |
| 7 | 21.752 | AIR | 6.693 |
| 8 | −33.773 | SK5 | 6.865 |
| 9 | 47.715 | AIR | 2.703 |
| 10 | 45.052 | SF6 | 4.881 |
| 11 | 25.250 | AIR | 1.092 |
| 12 | 29.141 | SK11 | 6.104 |
| 13 | −120.174 | AIR | 1.102 |
| 14 | 113.326 | FK3 | 3.379 |
| 15 | −37.859 | AIR | 17.093 |
| 16 | 87.406 | BAF4 | 3.426 |
| 17 | −64.601 | AIR | 40.945 |

* * * * *